(12) United States Patent
Finke et al.

(10) Patent No.: US 7,707,070 B2
(45) Date of Patent: Apr. 27, 2010

(54) METHOD AND SYSTEM FOR DYNAMIC PURCHASE ORDER HANDLING

(75) Inventors: Sabine Finke, Karlsruhe (DE); Martina Rothley, Schwetzingen (DE)

(73) Assignee: SAP AG, Walldorf (DE)

( * ) Notice: Subject to any disclaimer, the term of this patent is extended or adjusted under 35 U.S.C. 154(b) by 155 days.

(21) Appl. No.: 11/396,416

(22) Filed: Mar. 31, 2006

(65) Prior Publication Data

US 2007/0233576 A1     Oct. 4, 2007

(51) Int. Cl.
G06Q 30/00 (2006.01)
G06Q 10/00 (2006.01)

(52) U.S. Cl. .......................................... 705/26; 705/28
(58) Field of Classification Search ........................ None
See application file for complete search history.

(56) References Cited

U.S. PATENT DOCUMENTS

| | | | | |
|---|---|---|---|---|
| 6,697,824 | B1 * | 2/2004 | Bowman-Amuah | 709/229 |
| 2002/0128918 | A1 * | 9/2002 | Chao et al. | 705/26 |
| 2004/0019494 | A1 * | 1/2004 | Ridgeway et al. | 705/1 |
| 2004/0049433 | A1 * | 3/2004 | Yokoyama et al. | 705/26 |
| 2004/0230536 | A1 * | 11/2004 | Fung et al. | 705/64 |
| 2006/0036499 | A1 * | 2/2006 | Leu | 705/15 |
| 2007/0186252 | A1 * | 8/2007 | Maggio | 725/86 |

* cited by examiner

*Primary Examiner*—F. Ryan Zeender
*Assistant Examiner*—Mussa Shaawat
(74) *Attorney, Agent, or Firm*—Kenyon & Kenyon LLP (57) ABSTRACT

A method and system are provided for dynamic purchase ordering functionality in a business information system according to one embodiment of the present invention. The dynamic purchase ordering functionality receives a purchase order confirmation from a supplier and notifies the purchaser. If the supplier provides a deviating quantity in the purchase order confirmation (i.e., the supplier confirmed quantity is different than the purchaser ordered quantity), a dynamic availability of the product and/or service with the deviating quantity is determined and presented to the purchaser along with the purchase order confirmation in order to assist the purchaser in responding to the supplier's purchase order confirmation and to provide the purchaser with an integrated set of data in order to allow the purchaser greater flexibility and efficiency in responding to the supplier's purchase order confirmation. In this manner the purchase ordering system may be enhanced from the purchaser's perspective.

14 Claims, 7 Drawing Sheets

METHOD AND SYSTEM FOR DYNAMIC PURCHASE ORDER HANDLING

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for the dynamic handling of deviating quantities in the purchase order confirmation process according to one embodiment of the present invention.

BACKGROUND

Purchase ordering systems typically involve a purchaser submitting a purchase order to a supplier who determines what quantity he/she can supply. The supplier responds with a purchase order confirmation confirming the quantity that he/she is able and willing to provide according to the purchase order terms. If the supplier responds with a confirmed quantity that is different than the originally requested ordered quantity, the purchaser must determine how he/she will make up for this shortage (deviating quantity) and whether to proceed with the purchase order. Typically this determination has required the purchaser to search other reports and databases in order to determine which options are available resulting in a less efficient purchase ordering system.

The present invention presents an innovative method for addressing this problem by providing dynamically determined availability for a product and/or service with a deviating quantity along with the purchase order confirmation in order to facilitate the purchaser's decision regarding how to respond to the supplier.

DETAILED DESCRIPTION

A method and system are provided for dynamic purchase ordering functionality in a business information system according to one embodiment of the present invention. The dynamic purchase ordering functionality receives a purchase order confirmation from a supplier and notifies the purchaser. If the supplier provides a deviating quantity in the purchase order confirmation (i.e., the supplier confirmed quantity is different than the purchaser ordered quantity), a dynamic availability of the product and/or service with the deviating quantity is determined and presented to the purchaser along with the purchase order confirmation in order to assist the purchaser in responding to the supplier's purchase order confirmation and to provide the purchaser with an integrated set of data in order to allow the purchaser greater flexibility and efficiency in responding to the supplier's purchase order confirmation. In this manner the purchase ordering system may be enhanced from the purchaser's perspective.

Figure 1:
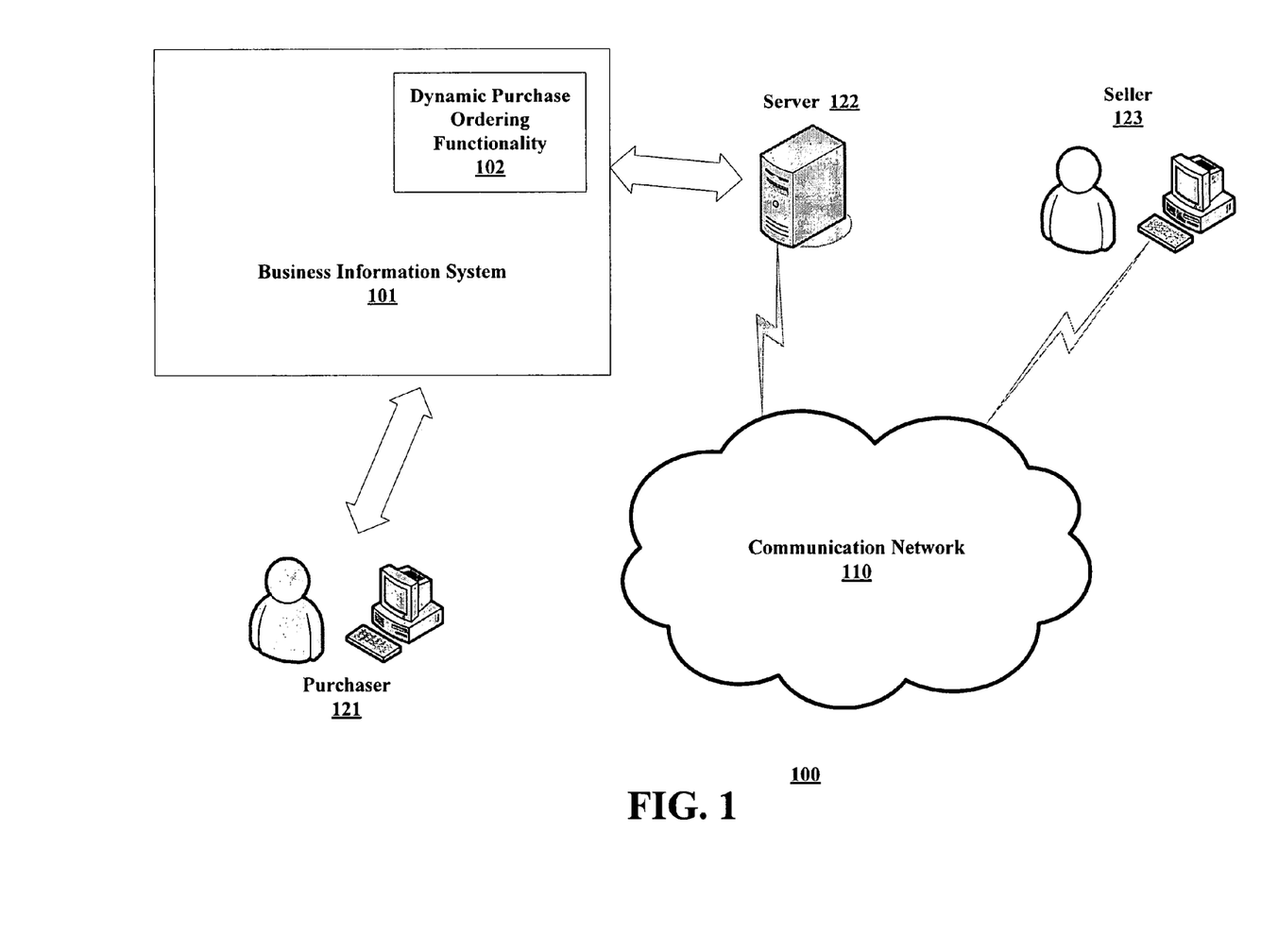
FIG. 1 is a diagram illustrating the network environment in which the dynamic purchase ordering functionality is provided according to one embodiment of the present invention.

FIG. 1 is a diagram illustrating the network environment in which the dynamic purchase ordering functionality is provided according to one embodiment of the present invention. The dynamic purchase ordering functionality 102 may consist of one or more software applications, programs, modules, procedures, or other computer code to include firmware and may additionally include stored data that may be part of the business information system 101 (e.g., a purchase order system) it works with (shown) or it may be external to the business information system 101 (not shown) where it provides specific purchase order handling functionality according to alternative embodiments of the present invention. In the embodiment shown in FIG. 1, the dynamic purchase ordering functionality is part of the purchaser's business information system 101 which may reside on a corporate server 122. In other embodiments, the business information system 101 and/or the dynamic purchase ordering functionality 102 may reside on one or more servers, computers, or other hardware platforms of the application environment 100. The server 122 may be connected to the purchaser 121 over an internal or external communication network (not shown) such as, for example, a local area network (LAN). The business information system 101, purchaser 121, and server 122 may also be linked to a supplier 123 over an external communication network 110 such as for example the Internet. In the embodiment shown, the purchaser 121 using the business information system 101 is connected to the communication network 110 and supplier 123 through the server 122. The application environment 100 shown is only one possible implementation of the dynamic purchase ordering functionality 102.

Figure 2:
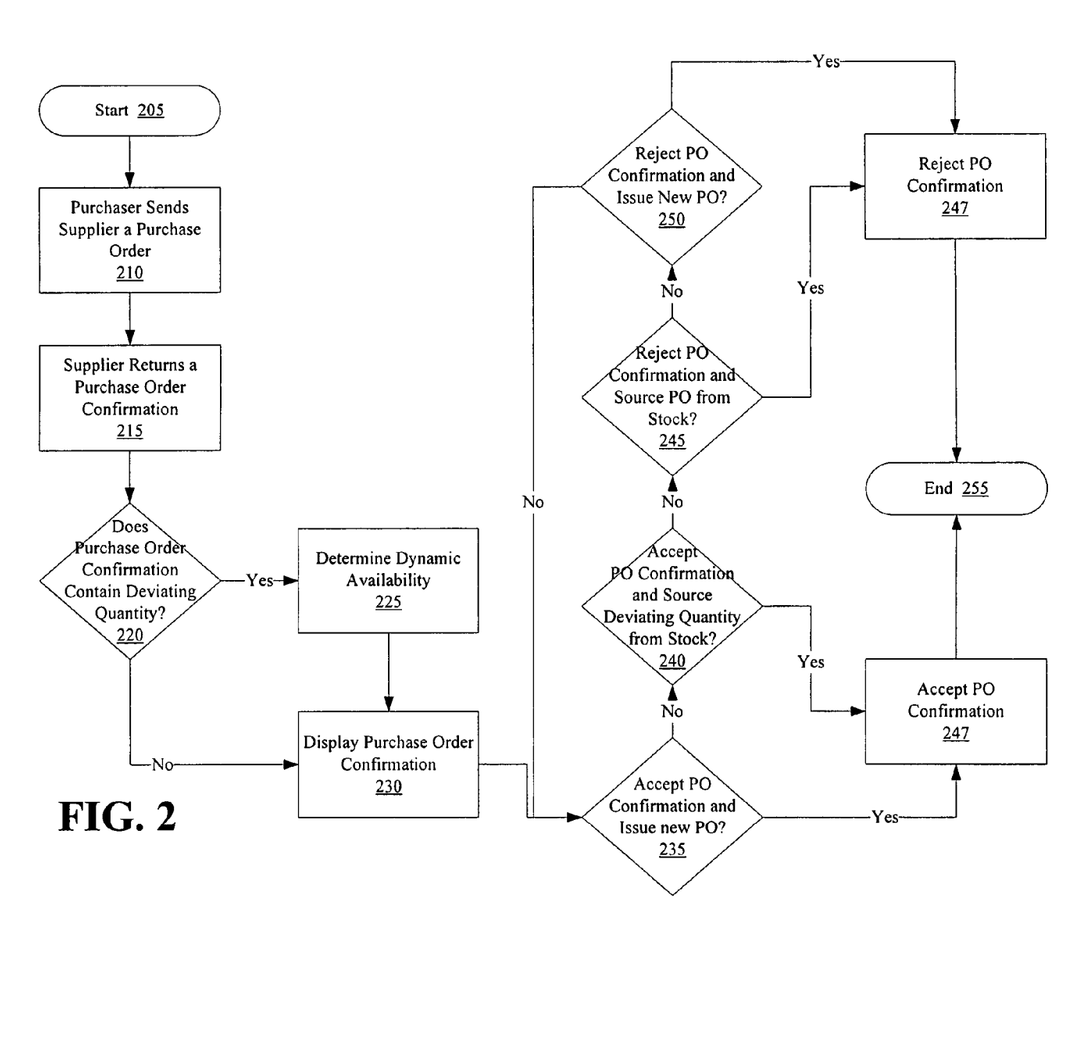
FIG. 2 is a flowchart of a purchase ordering process implementing dynamic availability reporting according to one embodiment of the present invention.

FIG. 2 is a flowchart of a purchase ordering process implementing dynamic availability reporting according to one embodiment of the present invention. The process begins 205 in a first step 210 where a purchaser sends a seller a purchase ordering using the purchaser ordering system. A purchase order is a buyer request for one or more products and/or services offered by a seller in a widely known means of business interaction. A purchase order may be drafted by a buyer (i.e., purchaser) and submitted to a seller (i.e., supplier) in a number of different formats using different transmission means. For example, a purchase order may be generated by a purchaser placing an order on a supplier's e-commerce network site. In another example, a purchaser's business information system (e.g., an inventory control system) may automatically generate a purchase order when an existing purchaser stock of a supplier product reaches or passes a determined threshold value. In a third example, a purchaser may complete a purchase order form and send the hardcopy purchase order form to a supplier by facsimile transmission (i.e., fax). These three examples are provided to illustrate the diverse means that a purchaser may use to generate a purchase order and for the submission of the purchase order to the supplier in various embodiments of the present invention.

In a second step 215, a purchase order confirmation is received from the supplier as a result of the purchase order submitted. The supplier determines the quantity of a requested (i.e., ordered) product and/or service in a purchase order that the supplier is capable of and will provide to the purchaser. The determined quantity may be determined automatically by the supplier using, for example, an inventory control system to calculate available quantity and demand for that quantity in order to calculate the determined quantity to be provided to the purchaser as a result of the purchase order. In an alternative embodiment of the present invention, the supplier may also determine whether the product and/or service requested in the purchase order will be provided or whether an equivalent product and/or service may be substituted to fulfill the purchase order. According to this alternative embodiment an understanding and expectation may need to be established in the relationship between the purchaser and the supplier that product and/or service substitution may occur as part of the ordering process. In addition to an understanding that the substitution of equivalent products and/or services may occur, a further understanding as to what constitutes an equivalent product and/or service may also need to be established. The supplier sends a confirmation message to the buyer informing the buyer about the quantity of the products and/or services that the supplier will provide to the purchaser based on the initial purchase order.

In the second step 215, the supplier 123 generally responds to the purchase order by generating a purchase order confirmation 215—documenting that the supplier 123 has received the order and agreeing to provide a quantity according to the terms therein. This purchase order confirmation 215 may also be generated and delivered to the purchaser 121 using any conventional means. For example, the supplier 123 may electronically generate a purchase order confirmation and email the purchase order confirmation to the purchaser 121. In the case where the supplier 123 receives an electronic purchase order, the supplier 123 may use the contents of the electronic purchase order to generate the purchase order confirmation. A purchase order confirmation may contain deviations from the original purchase involving one or more aspects of the purchase order. For example, the purchase order confirmation may alter the terms included in the purchase order including, for example, the price and/or the quantity that the supplier 123 can and/or will provide. Deviations in a purchase order confirmation from a purchase order commonly occur and usually involve a deviation to the quantity that the supplier 123 can provide. For example, if a purchaser requests 2000 units or product A in a purchase order for delivery by a certain date the supplier may only be able to delivery 1800 units of product A by that date. This deviation may be due to any of a number of reasons including, among others, a lack of inventory, production considerations, transportation considerations, commitments on other orders, etc. Because a purchase order with no deviations does not require additional processing and consideration by a purchaser, the first step in this dynamic ordering process may be considered to begin with the purchaser 121 receiving a purchase order with a deviating quantity of a product according to one embodiment of the present invention.

In a third step 220 when the purchaser views the purchase order confirmation, the dynamic purchase ordering functionality determines whether the purchase order confirmation contains a deviating quantity for a product and/or service. If a deviating quantity exists, a dynamic retrieval of product and/or service availability is made in a next step 225. This determination may be made for the product and/or service having the deviating quantity according to one embodiment of the present invention. In an alternative embodiment, the dynamic availability is determined for all the products and/or services in the purchase order. The purchase order confirmation is then displayed to the purchaser in further step 230 and includes the dynamic availability if a deviating quantity exists. The purchaser receives a purchase order notification in the business information system using the dynamic purchase ordering functionality 102. The notification is displayed to the purchaser in a quick activity report informing him/her regarding any deviation from the original purchase order.

The purchaser may then in a next step 235 choose to accept all the items in the purchase order confirmation 237 making up any shortage due to a deviating quantity by issuing another purchase order to another supplier. The purchaser may also in a further step 240 choose to accept all the items in the purchase order confirmation 237 making up any shortage due to a deviating quantity using the purchaser's own stock availability. The purchaser may also reject 247 the entire purchase order confirmation 245 and fulfill (source) the order using his/her stock availability. The purchaser may also in a further step 250 reject the entire purchase order confirmation 247 and look for another supplier. The purchase ordering system (i.e., the business information system) then tracks any existing purchase orders as is widely known and the process ends 255. The sequence from 235-250 do not represent a particular order and may be structured in any sequence.

Figure 3:
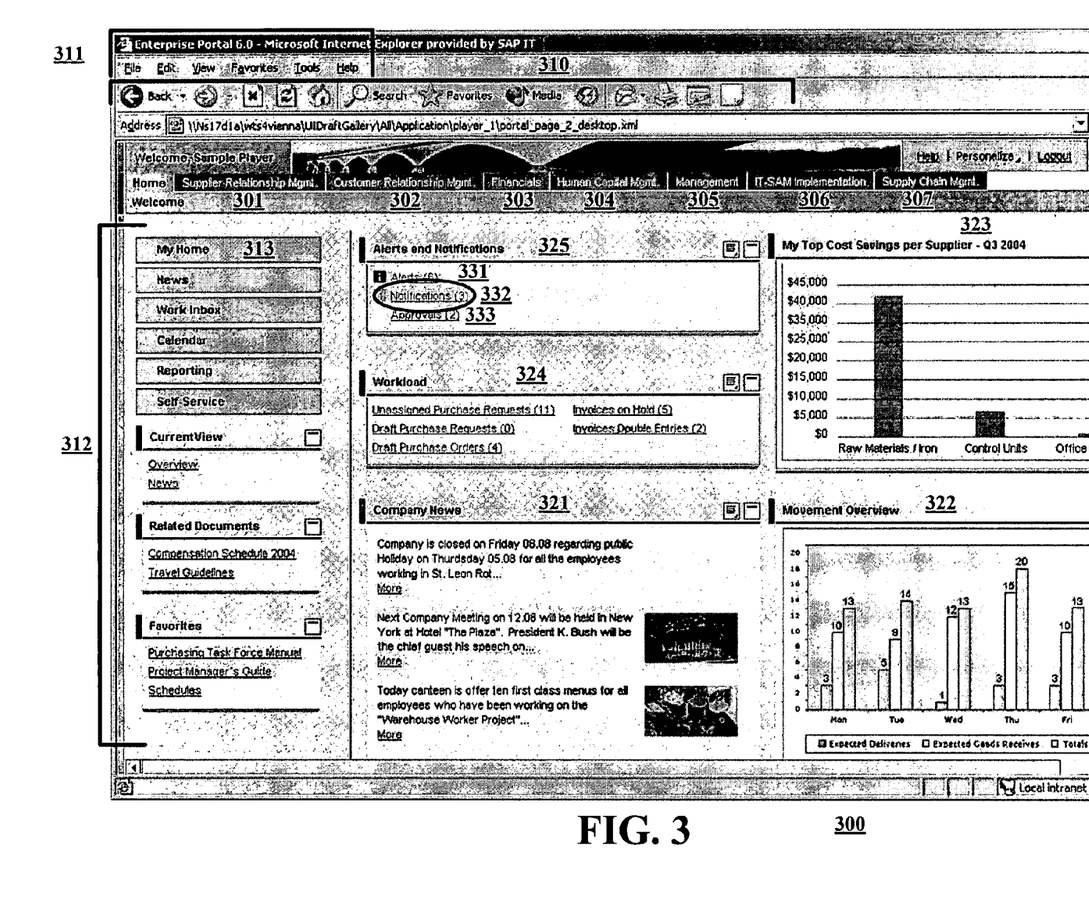
FIG. 3 is an example of a displayed screen for a business information system containing purchase order data using the dynamic purchase ordering functionality according to one embodiment of the present invention.

FIG. 3 is an example of a displayed screen for a business information system containing purchase order data using the dynamic purchase ordering functionality according to one embodiment of the present invention. The example business information system screen 300 is displayed in a web browser using known web browser navigation elements 310 and menus 311. In addition to the standard web browser elements 310-311 on the screen 300, information system specific navigation such as a horizontal row of navigation tabs 301-307 and a left-side pane containing navigation shortcuts 312 are also shown. The displayed screen 300 shows the contents of a customizable homepage which is indicated by the highlighted "My Home" navigation shortcut 313 on the left-side pane 312. The homepage shown in this example embodiment provides a summary of company news 321, a product movement graph 322, a cost savings graph 323, a workload summary 324, and an alerts and notifications summary 325. The alerts and notifications summary 325 displays the number of alerts 331, notifications 332, and approvals 333 for the purchaser. For example, there are currently three (3) notifications 332 available for the purchaser. The purchaser may click on the notifications link 332 to navigate directly to these notifications. These notifications may include a purchase order confirmation from the supplier that may or may not contain a deviating quantity for a product or service.

Figure 4:
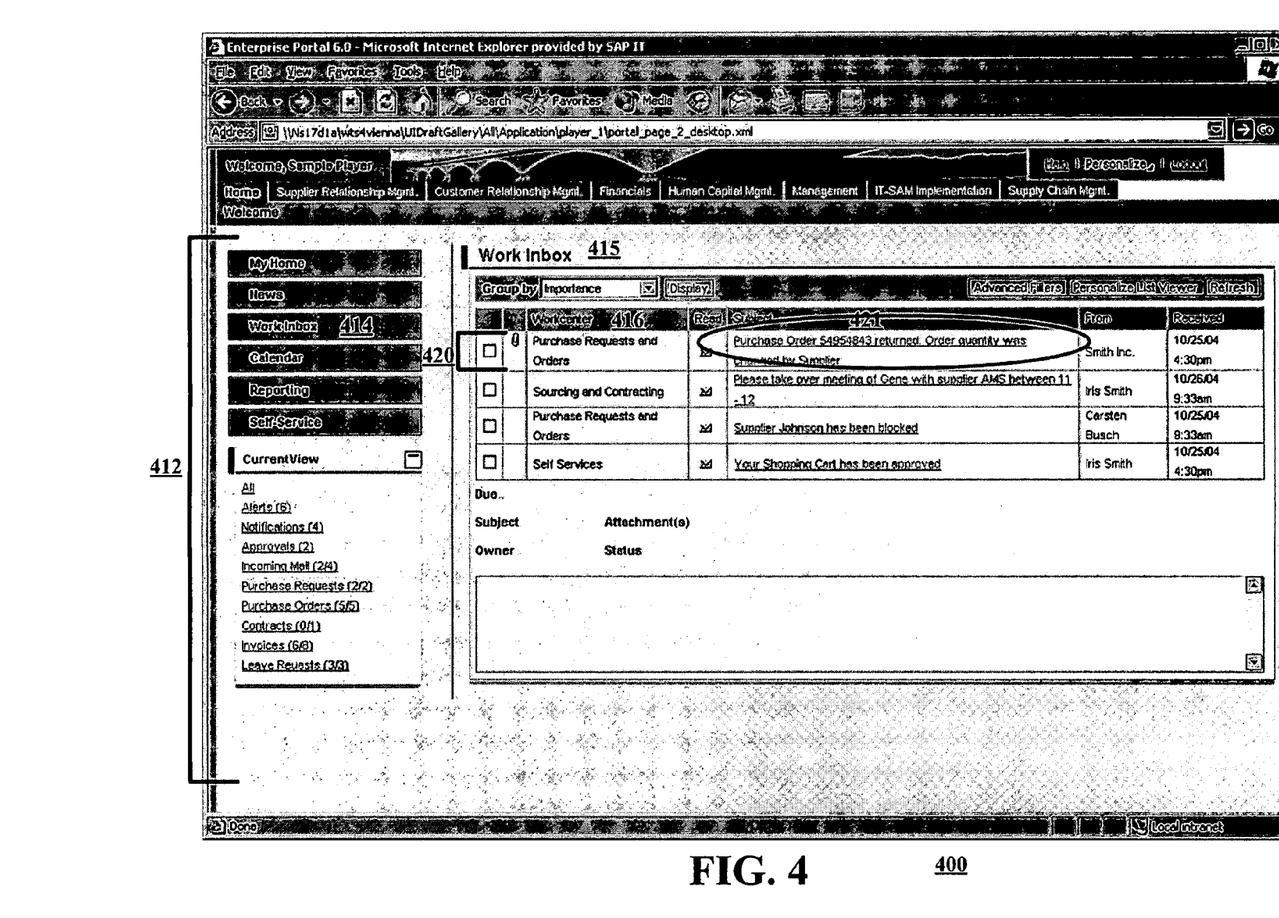
FIG. 4 is an example of a displayed screen for a business information system containing the work inbox for a purchaser using the dynamic purchase ordering functionality according to one embodiment of the present invention.

FIG. 4 is an example of a displayed screen for a business information system containing the work inbox for a purchaser using the dynamic purchase ordering functionality according to one embodiment of the present invention. The displayed screen 400 shows the work inbox which is indicated by the highlighted "Work Inbox" navigation shortcut 414 on the left-side pane 412 and the "Work Inbox" title 415 on the screen 400. The work inbox may include many types of messages belonging to different work centers 416, representing a category to which the message applies, such as for example "Purchase Requests and Orders". The messages shown in the work inbox are new messages that have not yet been viewed and/or acted upon according to this embodiment. In the example shown in FIG. 4, the first message 420 is a purchase order confirmation (which may also be referred to as a purchase order acknowledgement). The subject heading 421 for the first message 420 indicates that the purchase order confirmation contains a deviating quantity. The work inbox screen 400 allows the purchaser to view a summary of information from which he/she may then examine details as they feel necessary. If the purchase clicks on the message link in the subject column of the message, the purchaser will be presented (navigated to) the details of the message.

Figure 5:
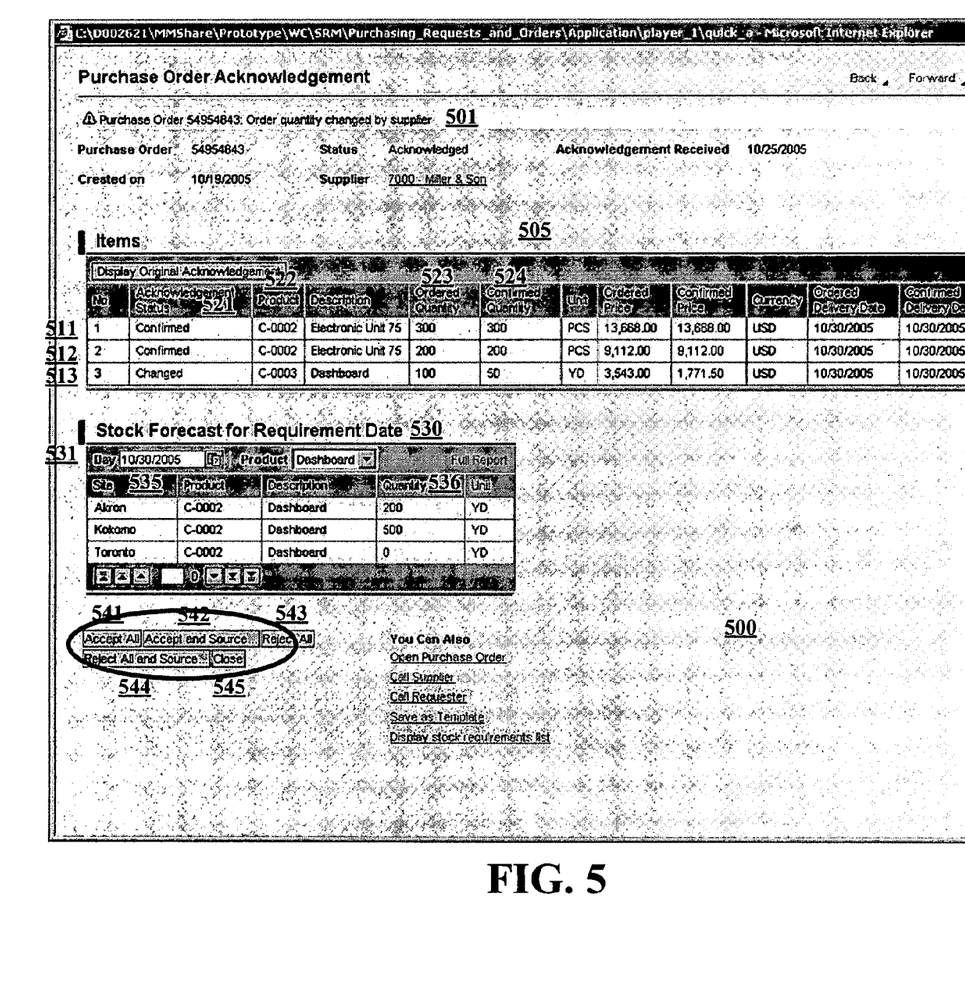
FIG. 5 is an example of a displayed screen for a purchase order confirmation in a business information system using the dynamic purchase ordering functionality according to one embodiment of the present invention.

FIG. 5 is an example of a displayed screen for a purchase order confirmation in a business information system using the dynamic purchase ordering functionality according to one embodiment of the present invention. The displayed screen 500 contains the details of a purchase order confirmation such as the purchase order confirmation shown in the work inbox in FIG. 4 (i.e., the first message in the work inbox 420). A message 501 at the top of the purchase order confirmation screen 500 identifies the purchase order number and informs the purchaser that the supplier has provided a deviating quantity (i.e., a change in the quantity) for one of the products or services in the purchase order. The items (i.e., the products and/or services) making up the purchase order are listed in an items table 505 on the screen 500. The first item 511 is an order for 300 units 523 of product "C-0002" 522 which is confirmed 521 by the supplier with a confirmed quantity 524 equal to the ordered quantity 523. The second item 512 is an order for 200 units 523 of the same product "C-0002" 522 which is also confirmed 521 by the supplier with a confirmed quantity 524 equal to the ordered quantity 523. The third item 513 is an order for 100 units 523 of product "C-0003" 522 which has been changed 521 by the supplier with only 50 units confirmed 524 instead of the 100 units requested 523. In the example shown in FIG. 5, the "Acknowledgement Status" column 521 values and "Confirmed Quantity" column 524 values for any items having a deviating quantity are displayed in a readily apparent manner such as for example the use of a different text color.

In addition to the items table 505, a dynamic availability table 530 for the products and/or services having a deviating quantity is also displayed in the purchase order confirmation screen 500 according to one embodiment of the present invention. The dynamic availability table 530 lists the forecasted availability of the product and/or service on the ordered delivery date (the requirement date) 531. The forecasted location of the product 535 and the forecasted quantity available 536 may be used by the purchaser to source any shortage between the ordered quantity 523 and the confirmed quantity 534. The purchase order confirmation for each item is displayed in the items table 505 along with the dynamic availability table 530 in order to provide the purchaser with sufficient information to make a decision on how to respond to the purchase order confirmation. The purchaser may accept all 541 the items as confirmed in the purchase order confirmation, the purchaser may accept the confirmed quantities and source the shortage 542 between the ordered quantity and the confirmed quantity using the dynamic availability data 530, the purchaser may reject all 543 the confirmed quantities in the purchase order, and the purchaser may reject all the confirmed quantities and source the shortage 544 using the dynamic availability data 530. The purchaser may also close 545 the purchase order confirmation and return to it later.

Figure 6:
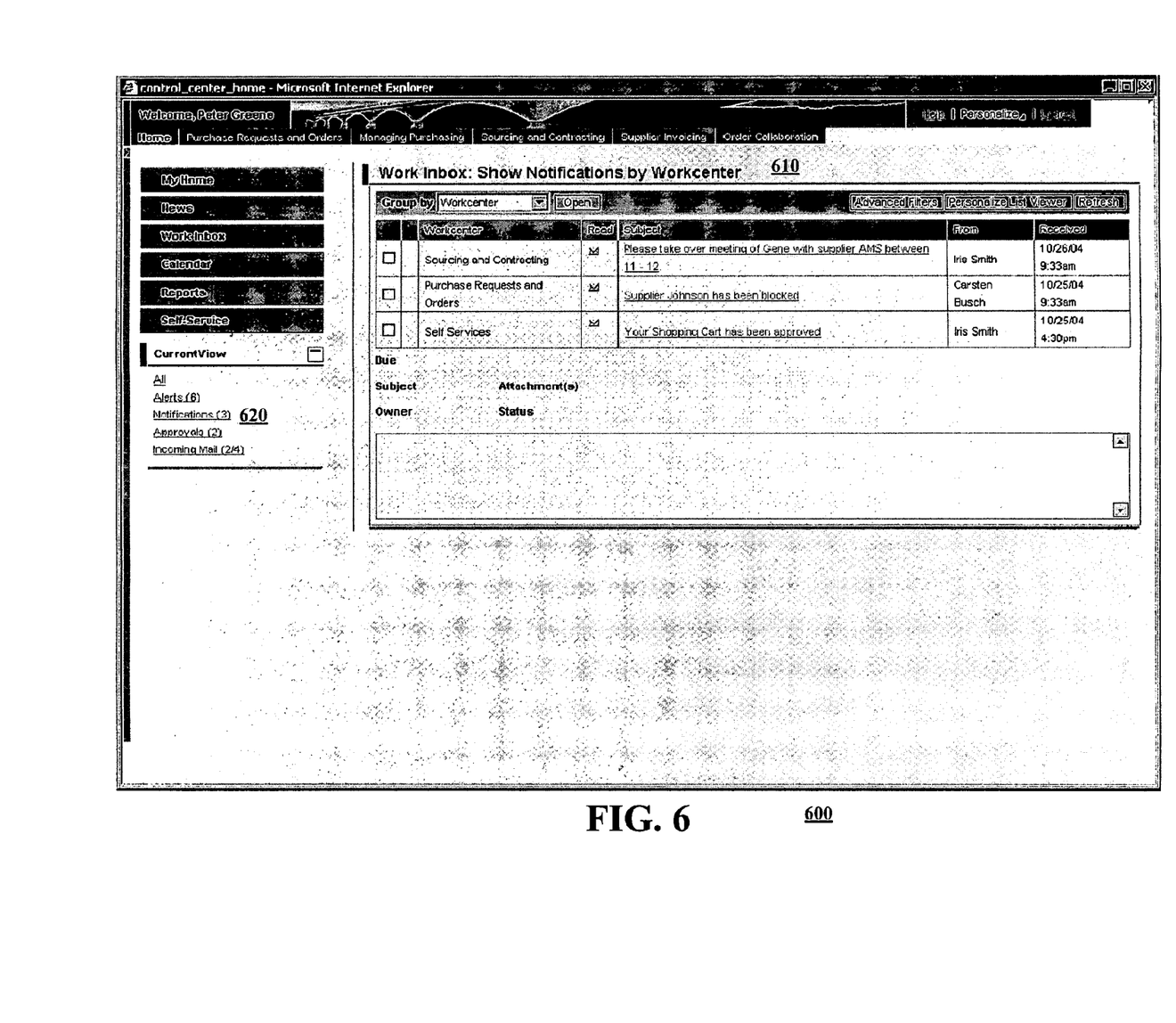
FIG. 6 is an example of a displayed screen for a business information system containing the work inbox for a purchaser using the dynamic purchase ordering functionality according to one embodiment of the present invention.

FIG. 6 is an example of a displayed screen for a business information system containing the work inbox for a purchaser using the dynamic purchase ordering functionality according to one embodiment of the present invention. The displayed screen 600 is the same as the displayed screen 400 in FIG. 4 except that the first message 420 as shown in FIG. 4 is reviewed as shown in FIG. 5 and all the supplier confirmed quantities are accepted 541. As a result of this example, the first message 420 no longer appears in the work center table 610 because the message has already been viewed and/or acted upon. The notifications navigation shortcut 620 on the left-side pane on the screen 620 may still be used to review this notification according to this embodiment.

Figure 7:
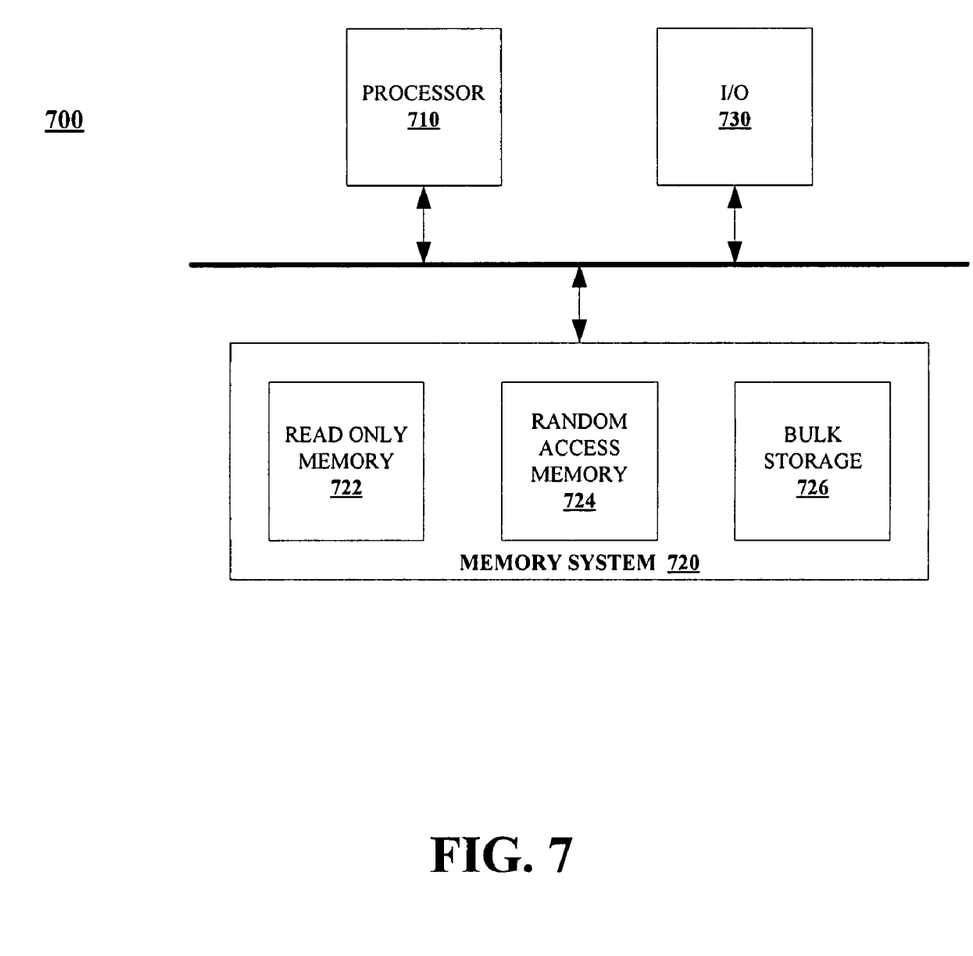
FIG. 7 is a block diagram illustrating the platform on which the dynamic purchase ordering functionality may operate according to one embodiment of the present invention.

FIG. 7 is a block diagram illustrating the platform on which the dynamic purchase ordering functionality may operate according to one embodiment of the present invention. Functionality of the foregoing embodiments may be provided on various computer platforms executing program instructions. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

In other embodiments of the present invention, the dynamic purchase ordering functionality may be applied in other contexts such as for example in the fulfillment of customer and production orders in the supply chain. According to this example, the dynamic availability of a product may be displayed along with a production order or purchase request in order to best determine how a user wants to fulfill a production or product/service need. It should therefore be understood that the present invention may be applied in contexts other than just a purchase ordering system.

What is claimed is:

1. A method for resolving a purchase order confirmation including a deviating quantity using a computer implemented business information system, comprising:

receiving, by a purchaser from a supplier, the purchase order confirmation, the purchase order confirmation including the deviating quantity of a product;

determining, at the time the purchase order confirmation is received, a purchaser existing stock availability for the product using a dynamic purchase ordering functionality module of the computer implemented business information system;

presenting both the purchase order confirmation and the purchaser existing stock availability to the purchaser in an integrated computer display; and selecting one of a plurality of resolution options using both the purchase order confirmation and the purchaser existing stock availability to resolve a deviation between a requested amount of the product presented in a purchase order and the deviating quantity, wherein the plurality of resolution options includes:

making up for a gap between a purchase order quantity of the product and the deviating quantity using the purchaser existing stock availability as a function of accepting the purchase order confirmation; and generating a new purchase order to a second supplier as a function of accepting the deviating quantity in the purchase order confirmation and as a function of the gap between the purchase order quantity of the product and the deviating quantity.

2. The method according to claim 1, further comprising:

including an action element for selecting the resolution option in the integrated computer display.

3. The method according to claim 2, wherein the action element is at least one of a button, a radio field, a drop-down option list box, and a menu item, a selection of the action element initiating program code for at least partial resolution of the purchase order confirmation including the deviating quantity.

4. The method according to claim 1, wherein the plurality of resolution options further includes:

filling the purchase order quantity of the product from the purchaser existing stock availability as a function of rejecting the purchase order confirmation; and issuing a second purchase order to the second supplier as a function of rejecting the purchase order confirmation and as a function of not using the purchaser existing stock availability.

5. The method according to claim 1, wherein the gap is a difference of the deviating quantity subtracted from the purchase order quantity.

6. A system for resolving a purchase order confirmation including a deviating quantity using a business information system, comprising:

a program memory;

a storage device; and a processor, wherein the processor is adapted to:

(i) receive, by a purchaser from a supplier, the purchase order confirmation, the purchase order confirmation including the deviating quantity of a product;

(ii) determine, when the purchase order confirmation is received, a purchaser existing stock availability for the product using a dynamic purchase ordering functionality module of the business information system;

(iii) present both the purchase order confirmation and the purchaser existing stock availability to a purchaser in an integrated computer display; and (iv) select one of a plurality of resolution options using both the purchase order confirmation and the purchaser existing stock availability to resolve a deviation between a requested amount of the product presented in a purchase order and the deviating quantity, wherein the plurality of resolution options includes:

making up for a gap between a purchase order quantity of the product and the deviating quantity using the purchaser existing stock availability as a function of accepting the purchase order confirmation; and generating a new purchase order to a second supplier as a function of accepting the deviating quantity in the purchase order confirmation and as a function of the gap between the purchase order quantity of the product and the deviating quantity.

7. The system according to claim 6, wherein the processor is further adapted to include an action element for selecting the resolution option in the integrated computer display.

8. The system according to claim 7, wherein the action element is at least one of a button, a radio field, a drop-down option list box, and a menu item, a selection of the action element initiating program code for at least partial resolution of the purchase order confirmation including the deviating quantity.

9. The system according to claim 6, wherein the plurality of resolution options includes:

making up for a gap between the purchase order quantity of the product and the deviating quantity using the purchaser existing stock availability as a function of accepting the purchase order confirmation;

generating a new purchase order to a second supplier as a function of accepting the deviating quantity in the purchase order confirmation and as a function of the gap between the purchase order quantity of the product and the deviating quantity;

filling the purchase order quantity of the product from the purchaser existing stock availability as a function of rejecting the purchase order confirmation; and issuing a second purchase order to the second supplier as a function of rejecting the purchase order confirmation and as a function of not using the purchaser existing stock availability.

10. A computer readable storage medium including instructions adapted to be executed by a computer to perform a method for resolving a purchase order confirmation including a deviating quantity using a business information system, the method comprising:

receiving, by a purchaser from a supplier, the purchase order confirmation, the purchase order confirmation including the deviating quantity of a product;

determining, when the purchase order confirmation is received, a purchaser existing stock availability for the product using a dynamic purchase ordering functionality module of the business information system;

presenting both the purchase order confirmation and the purchaser existing stock availability to a purchaser in an integrated computer display; and selecting one of a plurality of resolution options using both the purchase order confirmation and the purchaser existing stock availability to resolve a deviation between a requested amount of the product presented in a purchase order and the deviating quantity, wherein the plurality of resolution options includes:

making up for a gap between a purchase order quantity of the product and the deviating quantity using the purchaser existing stock availability as a function of accepting the purchase order confirmation; and generating a new purchase order to a second supplier as a function of accepting the deviating quantity in the purchase order confirmation and as a function of the gap between the purchase order quantity of the product and the deviating quantity.

11. The computer readable storage medium according to claim 10, the method further comprising:

including an action element for selecting the resolution option in the integrated computer display.

12. The computer readable storage medium according to claim 11, wherein the action element is at least one of a button, a radio field, a drop-down option list box, and a menu item, a selection of the action element initiating program code for at least partial resolution of the purchase order confirmation including the deviating quantity.

13. The computer readable storage medium according to claim 10, wherein the plurality of resolution options includes:
   filling a gap between the purchase order quantity of the product and the deviating quantity using the purchaser existing stock availability as a function of accepting the purchase order confirmation;
   generating a new purchase order to a second supplier as a function of accepting the deviating quantity in the purchase order confirmation and as a function of the gap between the purchase order quantity of the product and the deviating quantity;
   filling the purchase order quantity of the product from the purchaser existing stock availability as a function of rejecting the purchase order confirmation; and
   issuing a second purchase order to the second supplier as a function of rejecting the purchase order confirmation and as a function of not using the purchaser existing stock availability.

14. A method for resolving a purchase order confirmation using a computer implemented business information system, comprising:
   responsive to a purchase order for a purchase order quantity of a product, determining an available quantity of the product to fulfill the purchase order;
   if the available quantity is less than the purchase order quantity,
      verifying whether to substitute an alternate product to fulfill the purchase order;
      verifying whether the alternate product has been identified for the product,
         wherein if the alternate product is to be substituted to fulfill the purchase order and has been identified, replacing the product with the alternate product in the purchase order confirmation;
   receiving, by a purchaser from a supplier, the purchase order confirmation, the purchase order confirmation including the purchase order quantity of the alternate product;
   determining a purchaser existing stock availability for the product using a dynamic purchase ordering functionality module of the computer implemented business information system;
   presenting both the purchase order confirmation and the purchaser existing stock availability to a purchaser in an integrated computer display; and
   selecting one of a plurality of resolution options using both the purchase order confirmation and the purchaser existing stock availability to resolve a deviation between a requested amount of the product presented in a purchase order and the purchase order quantity of the substitute product presented in the purchase order confirmation, wherein the plurality of resolution options includes:
   making up for a gap between a purchase order quantity of the product and a deviating quantity using the purchaser existing stock availability as a function of accepting the purchase order confirmation; and
   generating a new purchase order to a second supplier as a function of accepting the deviating quantity in the purchase order confirmation and as a function of the gap between the purchase order quantity of the product and the deviating quantity.

* * * * *